(12) United States Patent
Agraharam et al.

(10) Patent No.: US 6,407,988 B1
(45) Date of Patent: Jun. 18, 2002

(54) MOBILITY SUPPORT SERVICES USING MOBILITY AWARE ACCESS NETWORKS

(75) Inventors: Sanjay Agraharam, Marlboro; Michael W. Hodic, Springfield; Ram S. Ramamurthy, Manalapan; Radhika R. Roy, Howell; David Hilton Shur, Aberdeen, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/166,805

(22) Filed: Oct. 6, 1998

(51) Int. Cl.$^7$ .................................................. H04J 3/24
(52) U.S. Cl. ...................................................... 370/328
(58) Field of Search ................................ 370/328, 351, 370/352, 401, 402, 403, 465, 474, 311, 389, 390, 399, 400; 704/228; 709/229, 228, 227; 713/200, 201, 202; 379/230, 221.08, 231, 232, 234, 240, 242, 220.01, 219; 455/422, 450, 437, 436, 439, 440, 442, 455, 456, 457, 555, 554, 560

(56) References Cited

U.S. PATENT DOCUMENTS 6,061,650 A * 5/2000 Malkin et al. ............... 370/401
6,229,810 B1 * 5/2001 Gerszbesg et al. .......... 370/906

OTHER PUBLICATIONS

Ramanathan, R. "Mobility Support for Nimrod: Challenges and Solution Approaches", RFC 2103, Feb. 1997, www.i-etf.org.
Solomon, J., "Applicability Statement for IP Mobility Support", RFC 2005, Oct. 1996, www.ietf.org.
"Network Working Group Request for Comments: 2002—IP Mobility Support," *Internet Official Protocol Standards*, C. Perkins, Editor, Oct. 1996, pp. 1–79.
"Network Working Group Request for Comments: 2004—Minimal Encapsulation within IP," *Internet Official Protocol Standards*, C. Perkins, Editor, Oct. 1996, pp. 1–6.
"Network Working Group Request for Comment: 2003—IP Encapsulation within IP," *Internet Official Protocol Standards*, C. Perkins, Editor, Oct. 1996, pp. 1–13.

* cited by examiner

*Primary Examiner*—Dang Ton
(74) *Attorney, Agent, or Firm*—Kenyon & Kenyon (57) ABSTRACT

A mobility support technique provides home agents and foreign agents in mobility aware access networks. Participating mobile hosts are assigned a home address that is used by other hosts as the mobile host's address. The home address actually addresses the home agent provided in the mobility aware access network. The home address provides additional privacy to the mobile host because it does not identify the mobile host's home premises network where the mobile host resides permanently absent any mobility of the mobile host. By providing home agents and foreign agents in a mobility aware access network, the agents may cooperatively establish optimal routing paths for data transmitted to a mobile host. The agents may identify a pseudo home agent, an agent in a mobility aware access network located near to a transmitting mobile host, that acts as the home agent of a destination mobile host. The pseudo home agent tunnels data directly to the destination mobile host without requiring the data to be routed first to the true home agent. In this regard, the pseudo home agent establishes a more direct routing path between the transmitting and destination mobile hosts.

15 Claims, 7 Drawing Sheets

MOBILITY SUPPORT SERVICES USING MOBILITY AWARE ACCESS NETWORKS

BACKGROUND OF THE INVENTION

1. Technical Field

This invention relates to mobility services provided to mobile computer users.

2. Related Art

The use of hand held and laptop devices for computing has proliferated in recent years. Computer users retrieve electronic mail and files from distant network servers, conference with fixed or mobile conferees, and use mobile applications for sales and monitoring of inventory, shipping and receiving. In mobile computing applications, computer users move temporarily from their home networks to foreign networks. Networks route data to users through use of Internet Protocol (IP) network addresses. When users move from one network to another frequently, the routing of data to the users becomes problematic.

Mobile IP support techniques are known per se. For example, the Internet Engineering Task Force ("IETF") has developed a mobile support standard that facilitates communications in a mobile environment. However, the standard has limited utility. First, existing mobility support protocols waste resources of the computer networks that route data to mobile hosts. Typically, data to be sent to a mobile host is addressed to a "home agent," a computer in the host's home network that provides mobility support to the mobile host. The data is routed through the network to the home agent. Upon receipt of data intended for the mobile host, the home agent retransmits the data though the network to a foreign agent at the mobile host's true location. Thus, two transmissions of data are required to get the data to a traveling mobile host. Such "two step" mobility support schemes reduce the capacity of the networks that carry data on behalf of the mobile hosts because the data travels through a non-optimal path. Further, existing mobility support protocols typically provide a home address for a mobile host that identifies a home network where the mobile host resides when it is not moving in a manner that does not maintain privacy.

Accordingly, there is a need in the art for a mobility support that provides enhanced privacy features to mobile hosts and that conserves resources of the networks that carry data to mobile hosts.

SUMMARY OF THE INVENTION

The present invention provides a mobility support technique, called the virtual mobile IP ("VMI") protocol. According to this invention, home agents and foreign agents are located in mobility aware access networks. Participating mobile hosts are assigned a "virtual home address." The virtual home address is actually an address of the home agent located in the mobility aware access network. The home address provides additional privacy to the mobile host because it does not identify the mobile host's home premises network.

By providing home agents and foreign agents in a mobility aware access network, the agents may cooperatively establish optimal routing paths for data transmitted to a mobile host. The agents may identify a pseudo home agent, an agent in a mobility aware access network located near to a transmitting mobile host, that acts as the home agent of a destination mobile host. The pseudo home agent tunnels data directly to the destination mobile host without requiring the data to be routed first to the true home agent. In this regard, the pseudo home agent establishes a more direct routing path between the transmitting and destination mobile hosts.

DETAILED DESCRIPTION

The present invention provides support for mobile computing in a multinetwork system. It provides several important advantages over the prior art IETF mobility protocol. First, the present invention provides greater privacy protection to mobile users than does the prior art. Second, the present invention provides improved routing optimization as compared to the prior art. Third, the present invention provides continuous service to users as they travel from network to network. Fourth, this invention removes mobility related processing from the mobile host's home premises network and places it in a Mobility Aware IP Network ("MAIN").

The advantages of the present invention are achieved by a system that places mobility support in an access network rather than a premises network as in the prior art. The access network establishes a home address for "mobile hosts," computer equipment used by mobile users. To send data to the mobile host, regardless of its location, it is necessary only to address the data to the host at its home address. The MAIN routes the data to the mobile host at its true location. Accordingly, the invention is called the virtual mobile IP ("VMI") protocol.

Various embodiments of the present invention may use one or more of the following types of addresses to identify a mobile host:

Home Address—An address used by the general public to route messages to the mobile host; the home address actually addresses a home agent of the mobile host.

Virtual Home Address—An address of a mobile host when the mobile host is located in its "home" premises network.

Care-of Address—An address used by a mobile host's home agent to route data to the mobile host in a foreign network; the care-of address actually addresses a foreign agent of the mobile host.

Temporary Foreign Address—An address of the mobile host in a foreign premises network.

Each of these addresses is explained in greater detail herein.

Figure 1:
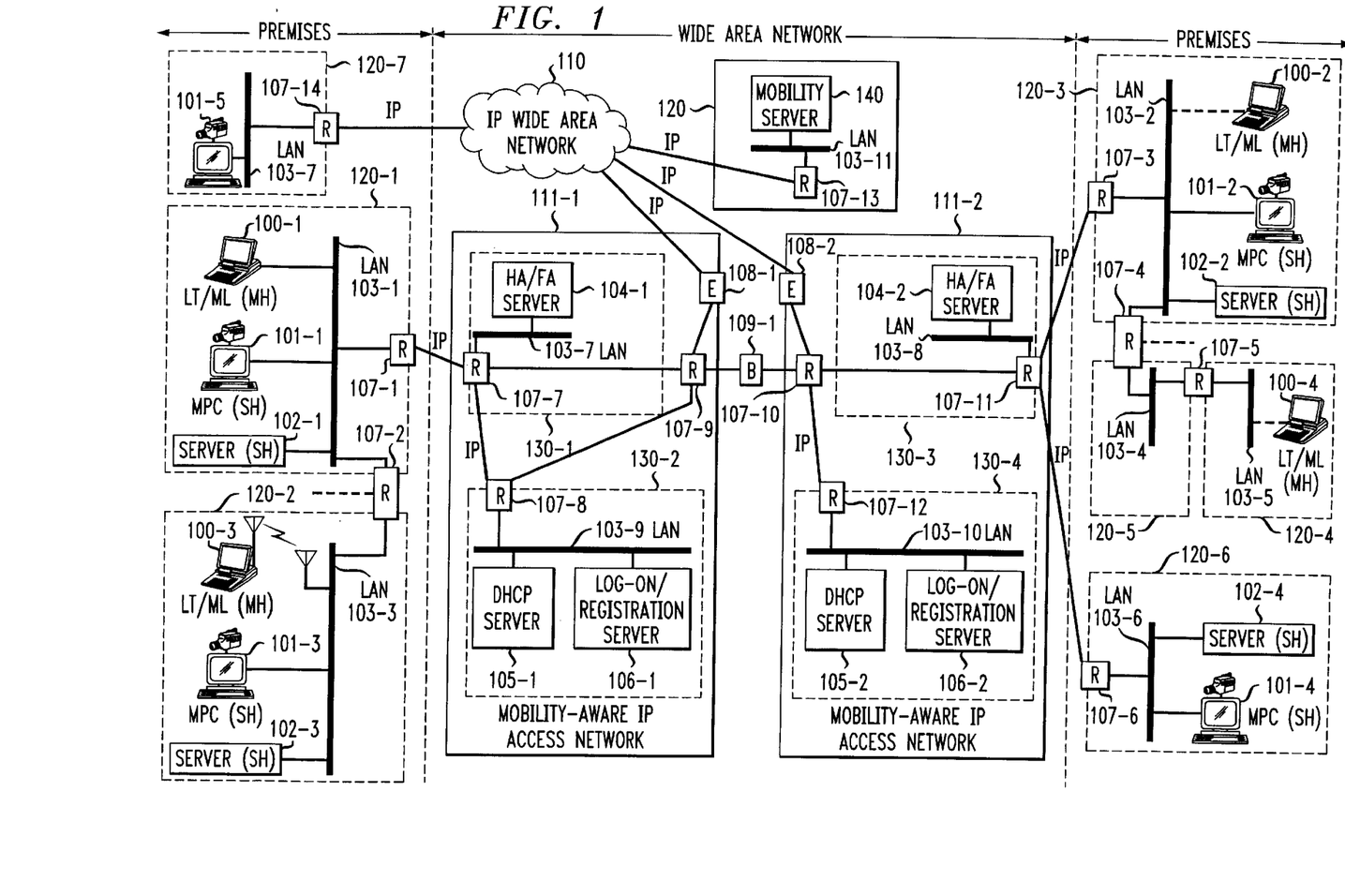
FIG. 1 is a block diagram of a network providing mobility services.

FIG. 1 illustrates a multi-network Internet system constructed in accordance with the present invention. The IP network includes a wide area network portion and premises network portions. The wide area network portion is populated by one or more wide area networks, 110, 111.1 and 111.2. The premises network portion is populated by premises networks 120.1–120.7. For the purposes of the mobility support of the present invention, the wide area network portion of the IP wide area network includes two types of wide area networks: 1) Mobility-Aware IP Networks (MAINs) 111.1, 111.2 that possess mobility support features and 2) other wide area networks (WANs) 110 that do not possess the mobility support features.

A "Mobility Aware IP Network" is a wide area network that operates according to Internet Protocol. It differs from a traditional wide area network because it includes "home agents" and "foreign agents" that provide mobility services to mobile hosts. Each MAIN covers a geographical area coextensive with premises networks to which it connects. For example, MAIN 111.2 covers a geographic area defined by the geographic scope of sub-networks 120.3–120.6. The MAIN 111.1 is programmed with a map (not shown) of the premises networks that are connected to MAINs 111.1–111.2.

MAINs 111.1, 111.2 typically include interconnected IP routers 107.7–107.12 and their own LANs 130.1–130.4. TheMAINs 111.1, 111.2 connect to each other and to other WANs 110 via routers 108.1–108.2, 109.1. Routers 108.1–108.2, 109.1 may communicate according to the known exterior gateway protocol, border gateway protocol or other conventional protocol. The MAINs also include LANs 103.7–103.10 that establish logical networks 130.1–130.4.

The logical networks 130.1–130.4 may include the home agent servers and foreign agent servers (shown as unitary servers 104.1–104.2), log-on/registration servers 106.1, 106.2 and Dynamic Host Configuration Protocol (DHCP) servers 105.1, 105.2. Optionally, home agents and foreign agents may be provided on different servers. Each logical network 130.1–130.4 connects to the remainder of the MAIN 111.1, 111.2 via routers 107.7–107.8, 107.11–107.12. The home agent servers and foreign agent servers 104.1–104.2 may be addressed using IP addressing.

Premises networks 120.1–120.7 may include a local area network 103.1–103.6 connected to a router 107.1–107.6, 107.14. The routers 107.1–107.6, 107.14 interconnect a premises network to a MAIN 111.1, 111.2 or to another premises network (see, router 107.2 connected to network 120.1). Hosts 100.1–100.4, 101.1–101.5, 102.1–102.4 may be provided in each premises network in communication with the LANs 103.1–103.7 either through direct connection or indirect communication (as by radio channel, see 100.3). The system also may include switched LAN configurations (not shown in FIG. 1 for simplicity).

Each LAN 103.1–103.7 forms a logical sub-network for Internet Protocol (IP) addressing purposes. For example, the computers (100.1, 101.1), routers (107.1, 107.2) and server (102.1) of the first LAN 103.1 form a first logical IP sub-network 120.1. Other logical IP sub-networks 120.2–120.7 are established by their respective LANs 103.2–103.7. As is known, hosts of each premises network are assigned an address that reflects their respective premises network.

Hosts may be one of two types: "mobile hosts" and "stationary hosts." As the name implies, mobile hosts may move among the premises networks 120.1–120.7 while stationary hosts may not. In FIG. 1, the shown laptop computers 100.1–100.4 are mobile hosts; desktop computers 101.1–101.5 and servers 102.1–102.4 are stationary hosts.

The LANs (103.1–103.7) may operate according to known LAN protocols such as Ethernet (IEEE 802.3), Token Ring (IEEE 802.5), Fast Ethernet (IEEE 802.10), 100VG. Any LAN (IEEE 802.12), or FDDI techniques.

In the main networks, home agents 104.1 maintain a database regarding each mobile host (say, 100.1) for which they provide mobility support. The database associates the mobile hosts's home address with its virtual home address. It also identifies whether the mobile host 100.1 is registered in a foreign network and, if so, it identifies a care-of address for a currently visited network and possibly a care-of address for a previously visited network.

Foreign agents 104.2 maintain databases regarding each mobile host 100.1 for which it is acting as a foreign agent. The database associates the mobile host's care of address with its temporary foreign address.

A mobility server 140 may be provided somewhere in the Internet network (in a WAN 110 or a MAIN 111.1–111.2). The mobility server 140 communicates with router 107.13 via a LAN 103.11. The mobility server, 140, the router 107.13 and the LAN 103.11 form an additional network 120. For each mobile host that is registered in a foreign network, the mobility server stores the care-of addresses for both a currently visited network and a previously visited network.

The VMI service is provided by subscription. A mobile user first registers with a service provider, one who maintains the MAINs (111.1, 111.2). When registered, the mobile user's host 100.1 is assigned a home address and a virtual home address. The mobile host's home address is advertised to the outside world as the address to be used to route data to the mobile host 100.1. The home address, however, actually addresses a home agent 104.1 of the MAIN 111.1.

The virtual home address of the mobile 100.1 represents the mobile host's address in its "virtual home network," a premises network 120.1 where the mobile host 100.1 is located when it does not move. The virtual home address is released only to the mobile host's home agent 104.1 (located within the MAIN 111.1) and, at times, a pseudo home agent (described below).

Mobile hosts register each time they connect to a new premises network. As part of the registration process, a mobile host determines whether it is in its home network or a foreign network. If the mobile host 100.1 determines that it is in its virtual home network 120.1, it communicates with its home agent 104.1 identifying that it is located in its virtual home network. The home agent 104.1 updates its database accordingly. Thereafter, either the mobile host 100.1 or the home agent 104.1 may communicate with the mobility server 140 to identify the mobile host 100.1 as being located in its home network.

When the mobile host 100.1 determines that it is located in a foreign network, such as network 120.4, it registers with a foreign agent 104.2. The mobile host 100.1 identifies the foreign agent 104.2, registers with it and obtains a "care-of" address on the foreign network 120.4. The care-of address is an address identifying the foreign agent 104.2. Thereafter, either the mobile host 100.1 or the foreign agent 104.2 communicate with the home agent 104.1 and the mobility server 140 providing the mobile host's new care-of address.

According to an embodiment of the present invention, a foreign network 120.4 may be one of two types: a "currently visited network" (CVN) or a "previously visited network" (PVN). When the mobile host 100.1 is located in a foreign premises network (say, 120.4) that network is designated the CVN. As the mobile host 100.1 moves among foreign networks (say, from network 120.4 to network 120.6), the old foreign network 120.4 becomes a PVN and the new foreign network 120.6 becomes the CVN. In accordance with the VMI protocol, a mobile host 100.1 receives a care-of address from the foreign agent connected to the new CVN. The care-of address assigned by the foreign agent of the PVN is de-registered. When a single foreign agent 104.2 is responsible for mobility support in both the CVN and the PVN, home agent 104.3 may retain the care-of address assigned when the mobile host 100.1 registered with the PVN.

The VMI mobility support system provides enhanced privacy because a mobile host's home address and virtual home address are unrelated. In known mobility support systems, home agents are provided in the mobile host's home premises network. Because both the mobile host and the home agent are located in the same network, the two addresses are highly related. Through observation of a mobile host's home address, one may identify the home premises network of the mobile host itself. Thus, the known mobility support systems provide only limited privacy.

According to the present invention, however, the home agent 104.1 may be maintained in a network 130.1 that has no relationship to the mobile host's virtual home network 120.1. Thus, a mobile host's home address and virtual home address have no relationship. The VMI mobility support system provides enhanced privacy over known mobility support systems.

Figure 2:
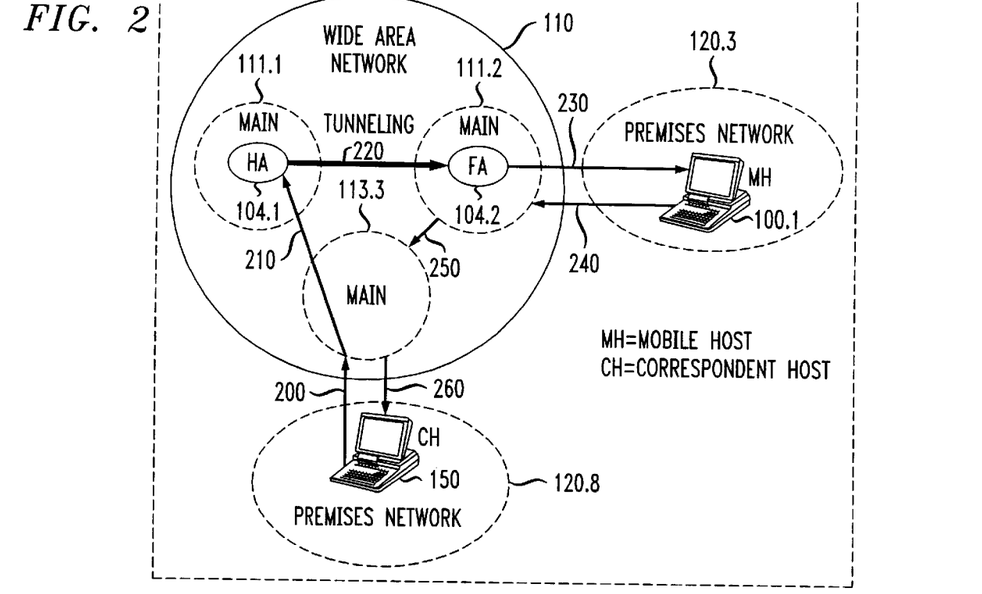
FIG. 2 shows VMI message flows in the case of non-optimized routing.

FIG. 2 illustrates an exemplary flow of data between a mobile host 100.1 and another host 150, called a "correspondent host," according to an embodiment of the present invention. In this example, the correspondent host 150 initiates communication. The correspondent host 150 addresses data to the mobile host 100.1 using its home address (Step 200). The correspondent host may be located in any premises network, those served by a MAIN 111.3 as shown or by a WAN (not shown). Based upon the home address, WANs and MAINs route the data to the mobile host's home agent 104.1 (Step 210). The home agent 104.1 "tunnels" (forwards) the data to the foreign agent 104.2 using the mobile host's care-of address. The MAINs 111.1, 111.2 route the data to the foreign agent 104.2 (Step 220). The foreign agent 104.2 retransmits the data to the mobile host 100.1 using the mobile host's temporary foreign address. MAIN 111.2 and premises network 120.3 route the data to the mobile host 100.1 (Step 230).

In the reverse direction, data to be sent from the mobile host 100.1 to a correspondent host is addressed directly to the correspondent host. The premises networks 120.3, 120.8, MAINS 111.2–11.3 and WAN route the data to the correspondent host 150 (Steps 240–260). In the message generated by the mobile host 100.1, the mobile host 100.1 identifies its home address (at the home agent 104.1) to identify origination. Data addressed to the correspondent host need not necessarily traverse any home agent or foreign agent.

Embodiments of the VMI invention optimize data flow through the MAINs 111.1–111.3. When the home agent 104.1 tunnels data to a mobile host 100.1, the home agent 104.1 may examine the data to identify the correspondent host 150. If the correspondent host 150 is located in a network that is connected to a MAIN 111.3, the home agent causes an entity within the MAIN 111.3 to act as a "pseudo home agent" for mobile host 100.1.

Figure 3:
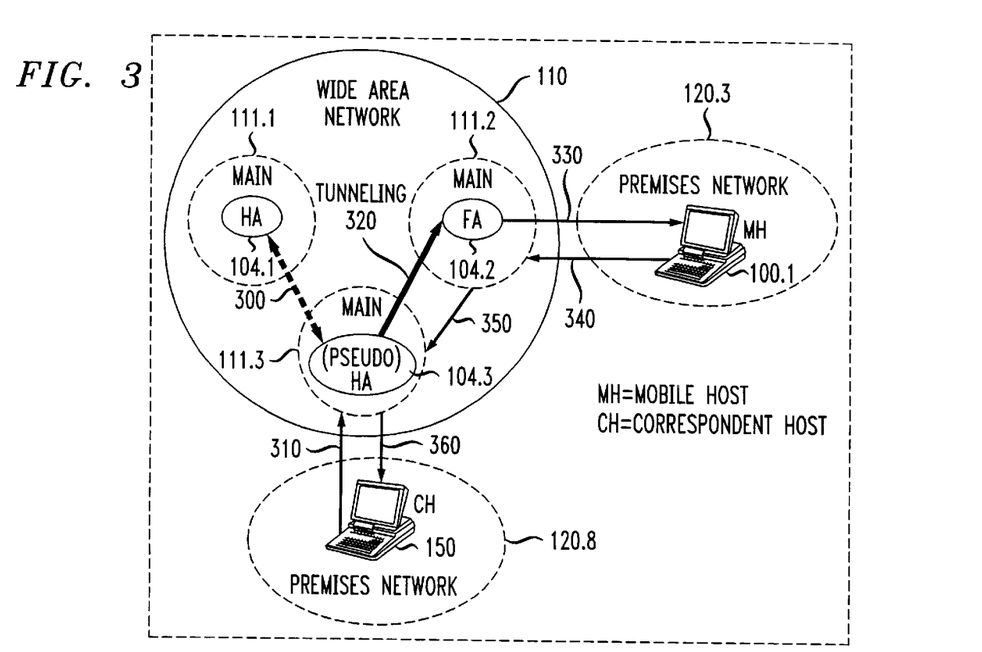
FIG. 3 depicts VMI message flows in the case of optimized routing.

FIG. 3 illustrates signal flow in a network to establish optimal data paths. After tunneling the first data packet (Step 220 in FIG. 2), the home agent 104.1 identifies a home pseudo agent 104.3 in a MAIN 111.3 nearest to the correspondent host 150. It signals the agent 104.3 with a request to become a "pseudo home agent" for the mobile host 100.1, identifying the mobile host's home address and its care-of address (Step 300, FIG. 3). The pseudo home agent 104.3 acknowledges the request and configures the MAIN's routers to route data addressed to the home address to the pseudo home agent 104.3 rather than the home agent 104.1.

Subsequently, when the correspondent host 150 transmits additional data to the mobile host 100.1, the MAIN 111.3 routes the data to the pseudo home agent 104.3 (Step 310). The pseudo home agent 104.3 tunnels the packet to the foreign agent 104.2 using the mobile host's care-of address (Step 320). The foreign agent 104.2 retransmits the data to the mobile host 100.1 at its temporary foreign address (Step 330).

In the reverse direction, data to be sent from the mobile host 100.1 to a correspondent host 150 is addressed directly to the correspondent host 150. just as in the signal flow of FIG. 2, the premises networks 120.3, 120.8, MAINS 111.2–11.3 and WAN route the data to the correspondent host 150 (Steps 340–360).

Accordingly, the VMI invention may provide optimal data paths through a mobility aware network. After an initial tunneling step performed by a home agent, data from a correspondent host traverses to a nearby pseudo home agent, to a foreign agent and to the mobile host. This is an improvement over known mobility support techniques in which all data must travel from correspondent host to a home agent (which may not be located near to the correspondent host), from a home agent to a foreign agent, and from a foreign agent to a mobile host. Because the pseudo home agent is provided in a MAIN close to the correspondent host, the path of data from the correspondent host to the mobile host is made to be almost a direct path.

The remaining discussion illustrates operation of the VMI service in certain applications and explains how privacy and route optimization are maintained.

Figure 4:
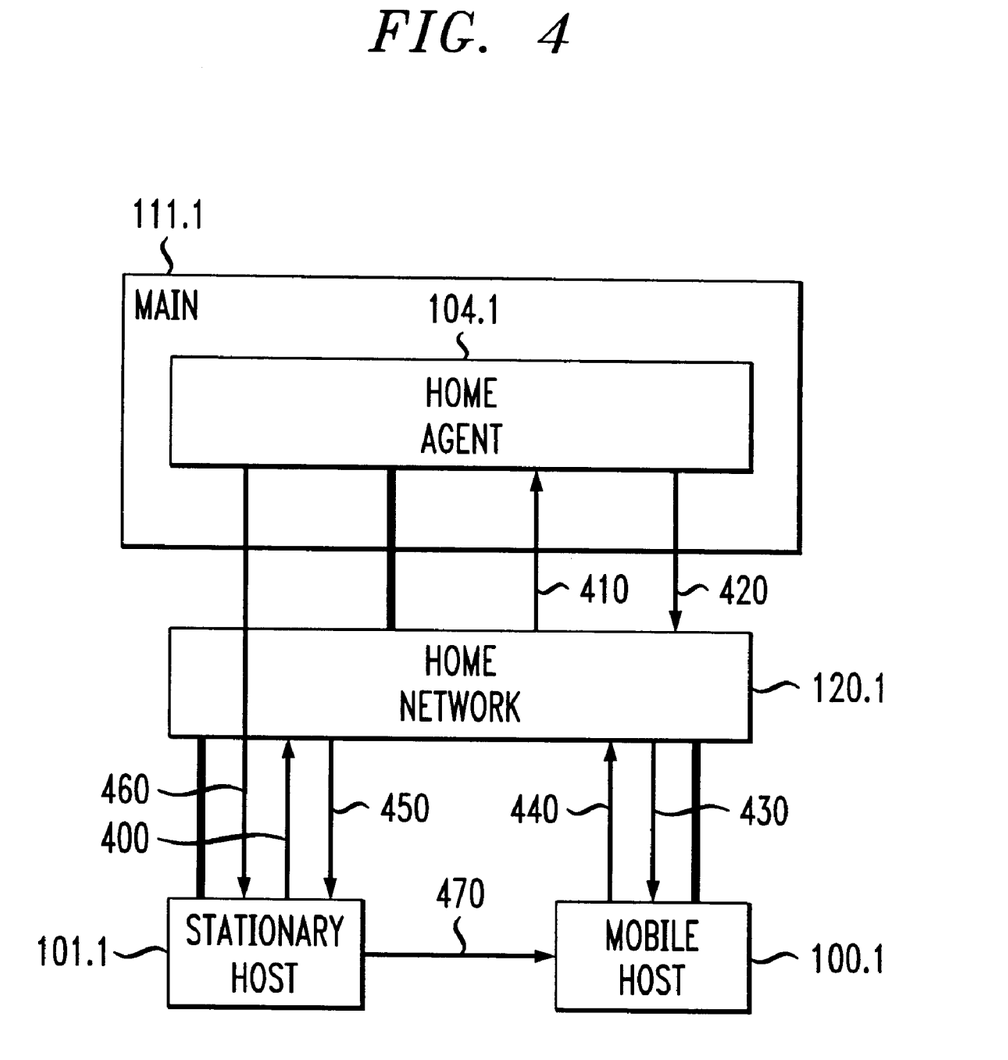
FIG. 4 is a simplified diagram of a network implementation of the present invention.

FIG. 4 shows an example of data flow between the mobile host and the stationary host. Both the mobile host 100.1 and stationary host 101.1 are located in the mobile host's virtual home network 120.1. Initially, privacy is maintained because the stationary host 101.1 cannot determine where the mobile host 100.1 actually resides. Initially, the traffic paths are not optimized. The stationary host 101.1 addresses data to the mobile host at its home address. It transmits the data to the home network 120.1 (Step 400). The virtual home network 120.1 routes the data to the home agent 104.1 in the MAIN 111.1 (Step 410). The home agent 104.1 determines the location of the mobile host and routes the message to the mobile host 100.1 at its virtual home address (Steps 420–430).

If the mobile host 100.1 sends a reply message to the stationary host 101.1, the virtual home network 120.1 forwards the message directly to the stationary host 101.1 (Steps 440–450).

Route optimization may occur if the home agent 104.1 releases the mobile host's virtual home address to the stationary host 101.1. In this case, the home agent 104.1 signals the stationary host with mobile host's virtual home address (Step 460). Subsequently, the stationary host 101.1 addresses data to the mobile host at its virtual home address (Step 470).

Typically, a home agent 104.1 will disclose a mobile host's virtual home address to another host (such as stationary host 101.1) only after authorization by the mobile host 100.1.

Figure 5:
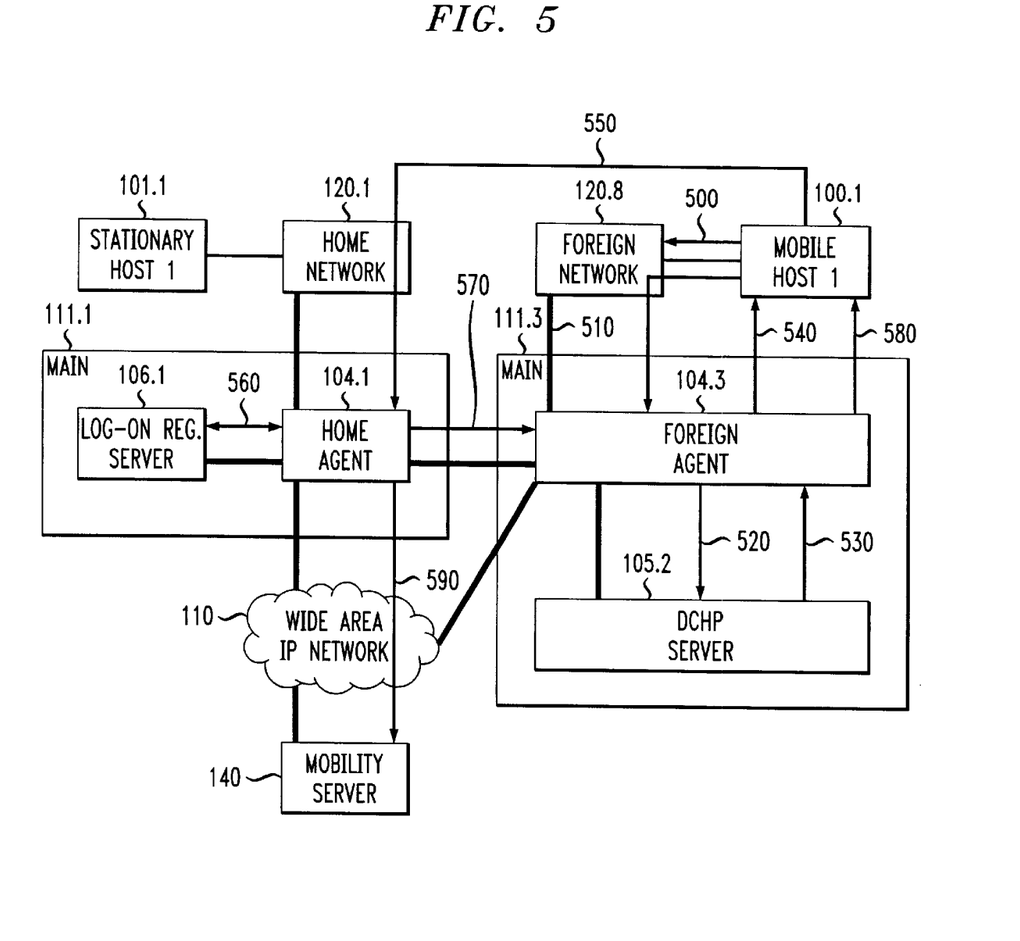
FIG. 5 is a simplified diagram of another network implementation of the present invention.

FIG. 5 illustrates registration of the mobile host 100.1 in FIG. 1 in a foreign network 120.8. The mobile host 100.1 registers with foreign network 120.8 and determines that the network 120.8 is not its home network 120.1 (Step 500). The mobile host 100.1 monitors traffic to identify an address of a foreign agent 104.3. A foreign agent 104.3 repeatedly advertises its address on the premises networks 120.8 for which it provides mobility support. The MAIN's router (not shown, part of MAIN 111.3) and the foreign network router (not shown, part of network 120.8) forwards address advertisement messages through network 120.8. Once the mobile agent 100.1 identifies the foreign agent 104.3, it sends a DHCP message to the foreign agent 104.3 (Step 510). The foreign agent 104.3 forwards the DCHP message to the DHCP 105.2 (Step 520). The DHCP server 105.2 processes the DCHP message and allocates a temporary foreign address on foreign network 120.8 for the mobile host 100.1.

The temporary foreign address identifies the mobile host's address in the foreign network 120.8. The DHCP server 105.2 sends a reply message identifying the temporary foreign address (Step 530). The foreign agent 104.3 stores the temporary foreign address in its address table and routes the message to the mobile host 100.1 via the foreign network 120.8 (Step 540).

After receiving the temporary foreign address, the mobile host 100.1 registers with its home agent 104.1 (Step 550). Registration identifies to the home agent 104.1 that the mobile host 100.1 has moved to a foreign network. The mobile host 100.1 sends a "Registration & Address Update" message to its home agent 104.1 via the foreign network 120.8 and MAIN 111.1 and 111.3. Alternatively, the foreign agent 104.3 could generate the registration message autonomously. Optionally, the home agent 104.1 and/or mobile host 100.1 communicate with a log-on registration server 106.1 to authenticate the mobile host 100.1 (Step 560). The home agent 104.1 updates its address table, storing the address of the foreign agent 104.3 as the care-of address of the mobile host 100.1.

The home agent 104.1 sends a registration message to the foreign agent 104.3 that it has registered the mobile host 100.1 (Step 570). The foreign agent 104.3 updates its address table with the temporary foreign address of the mobile host 100.1, and forwards the registration message to the mobile host 100.1 via foreign network 120.8 (Step 580). At this point, the mobile host 100.1, the foreign agent 104.3 and the home agent 104.1 are ready for communication.

Optionally, the home agent 104.1 signals the mobility server 140 via WAN 110 identifying the care-of address of the mobile host 100.1 (Step 590). The mobility server 140 confirms and updates its address table. In this manner, the mobility server 140 always possesses the latest care-of address of the mobile host 100.1. The mobility server 140 becomes a central repository of current address information for the mobile host 100.1 to resolve any conflicts that may arise due to its movement among premises networks.

Figure 6:
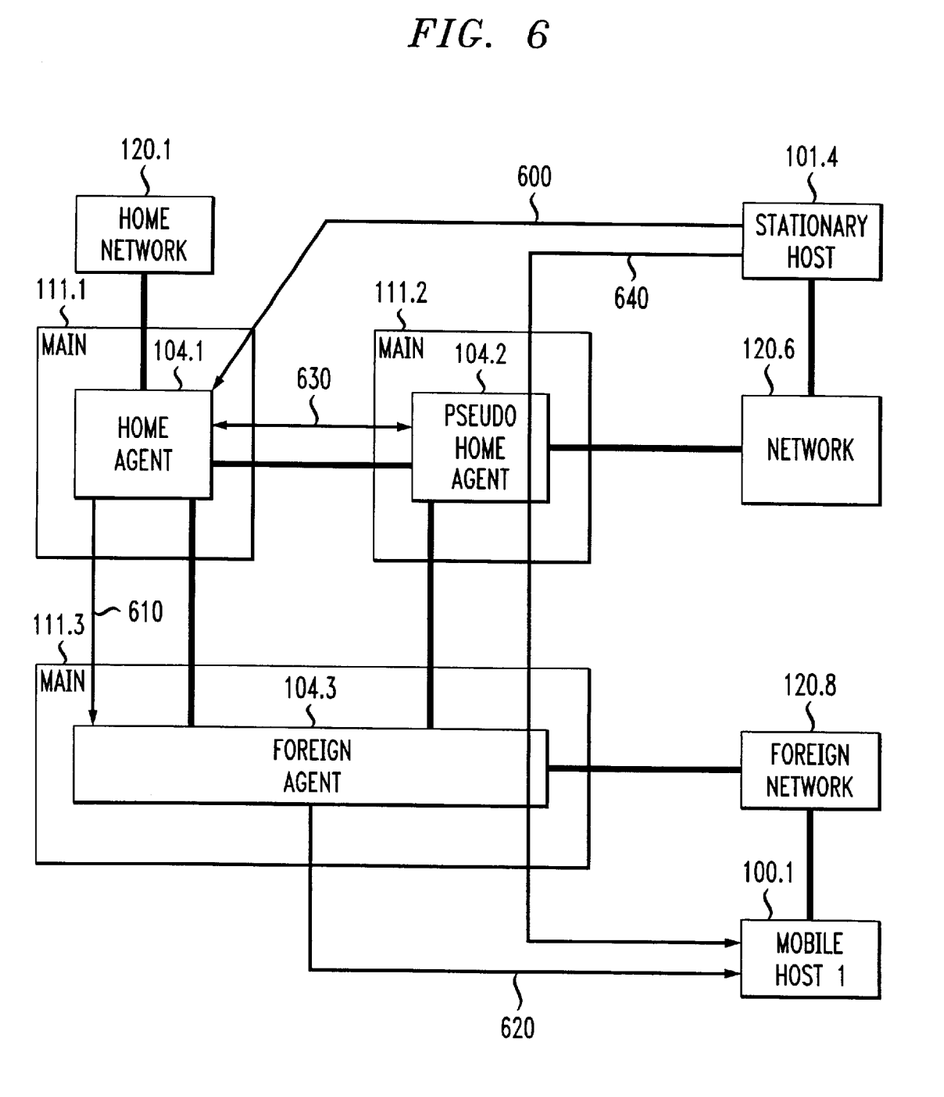
FIG. 6 is a simplified diagram of yet another network implementation of the present invention.

FIG. 6 illustrates exemplary data paths extending from a stationary host 101.4 of a premises network 120.6 and a mobile host 100.1 that is registered in a foreign network 120.8. The stationary host 101.4 sends data to the mobile host 100.1 at its home address (Step 600). The home agent 104.1 tunnels the message to the foreign agent 104.3 using the mobile host's care-of address (Step 610). The foreign agent 104.3 forwards the message to the mobile host 100.1 via the foreign network 120.8 (Step 620).

The home agent 104.1 identifies the stationary host 101.4 as the source of the data. It determines that the stationary host 101.4 is serviced by a MAIN, namely MAIN 111.2. Because the stationary host 101.4 is connected to a MAIN, home agent 104.1 begins a route optimization process. The home agent 104.1 identifies an entity (agent 104.2) in the MAIN 111.2 that may act as a pseudo home agent. Because the pseudo home agent 104.2 is different from the home agent 104.1 itself, the home agent 104.1 determines that the route from the stationary host 101.4 to the mobile host 100.1 through home agent 104.1 is not optimal. The home agent 104.1 signals agent 104.2 requesting that it act as a pseudo home agent (Step 630). The agent 104.2 acknowledges that it is to become a pseudo home agent for mobile host 100.1. Subsequent data sent by the stationary host 101.4 to the mobile host 100.1 will be routed to the foreign agent 104.3 by the pseudo home agent 104.2 rather than the true home agent 104.1 (Step 640).

For messages sent from the mobile host 100.1 to the stationary host 101.4, the mobile host 100.1 address the stationary host 101.4 according to traditional addressing.

Figure 7:
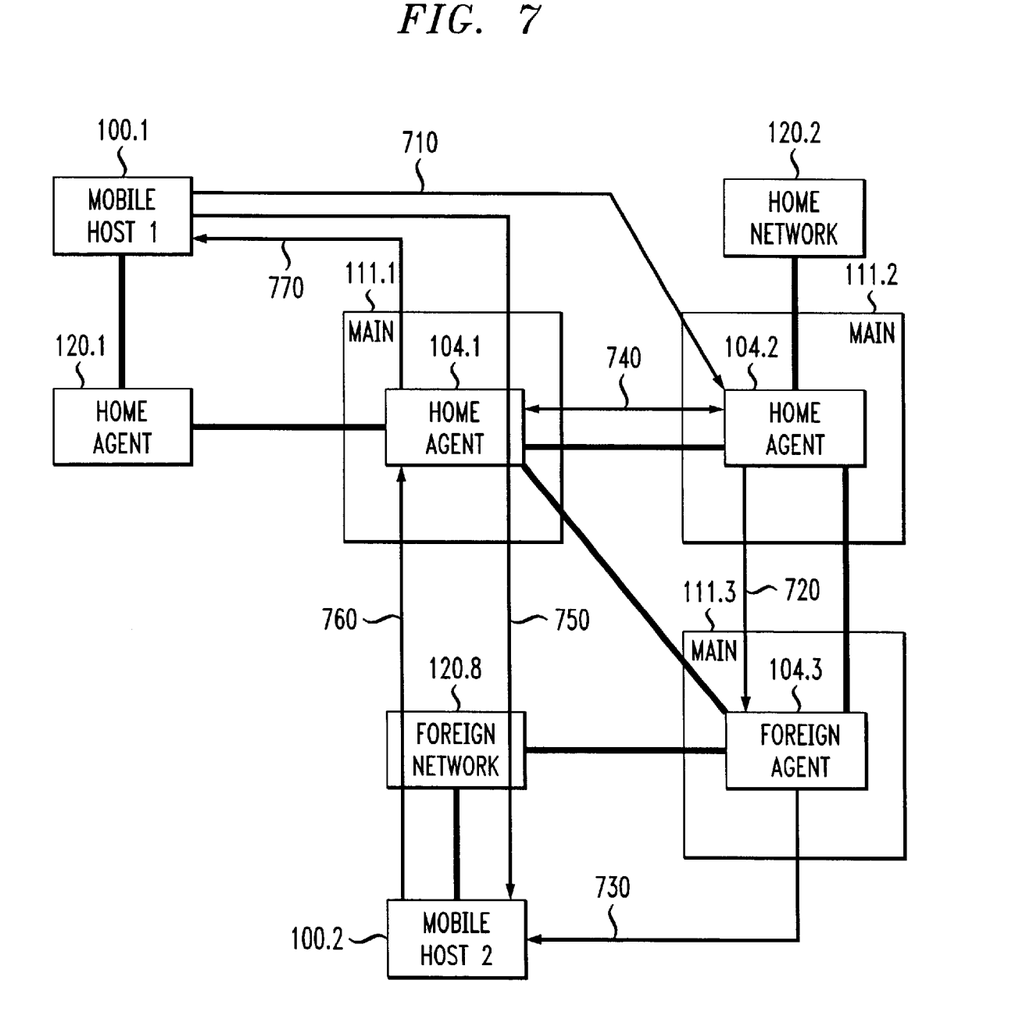
FIG. 7 is simplified diagram of still another network implementation of the present invention.

FIG. 7 illustrates an example of communication flow between two mobile hosts 100.1, 100.2. In this example, a first mobile host 100.1 resides in its home premises network 120.1 and a second mobile host 100.2 is registered in a foreign premises network 120.8. The first mobile host 100.1 sends a message bearing the second mobile host's 100.2 home address (Step 710). The second mobile host's 100.2 home address references the home agent 104.2 of the second mobile host 100.2. The network routes the message to the home agent 104.2. The home agent 104.2 tunnels the message to the second mobile host's foreign agent 104.3 (Step 720). The foreign agent 104.3 forwards the message to the second mobile host 100.2 via the foreign premises network 120.8 (Step 730).

The home agent 104.2 identifies the first mobile host 100.1 as the source of the data. It determines that the first mobile host 100.1 is connected to a MAIN, namely MAIN 111.1. Because the mobile host 100.1 is connected to a MAIN 111.1, home agent 104.2 begins a route optimization process. The home agent 104.2 identifies an entity (home agent 104.1) in the MAIN 111.1 that may act as a pseudo home agent. Because the pseudo home agent 104.1 is different from the home agent 104.2 itself, the home agent 104.2 determines that the route from the first mobile host 100.1 to the second mobile host 100.2 is not optimal. The home agent 104.2 requests home agent 104.1 to act as a pseudo home agent (Step 740). Subsequent data sent by the first mobile host 100.1 to the second mobile host 100.2 will be routed to the foreign agent 104.3 through the pseudo home agent 104.1 rather than the true home agent 104.2 (Step 750).

For messages sent from the second mobile host 100.2 to the first mobile host 100.1, the second mobile host 100.2 addresses the first mobile host 100.1 according to its home address (Step 760). Because the first mobile host 100.1 is located in its premises network 120.1 within premises, route optimization is assured. The home agent 104.1 routes the data to the mobile host 100.1 via premises network 120.1 (Step 770).

Figure 8:
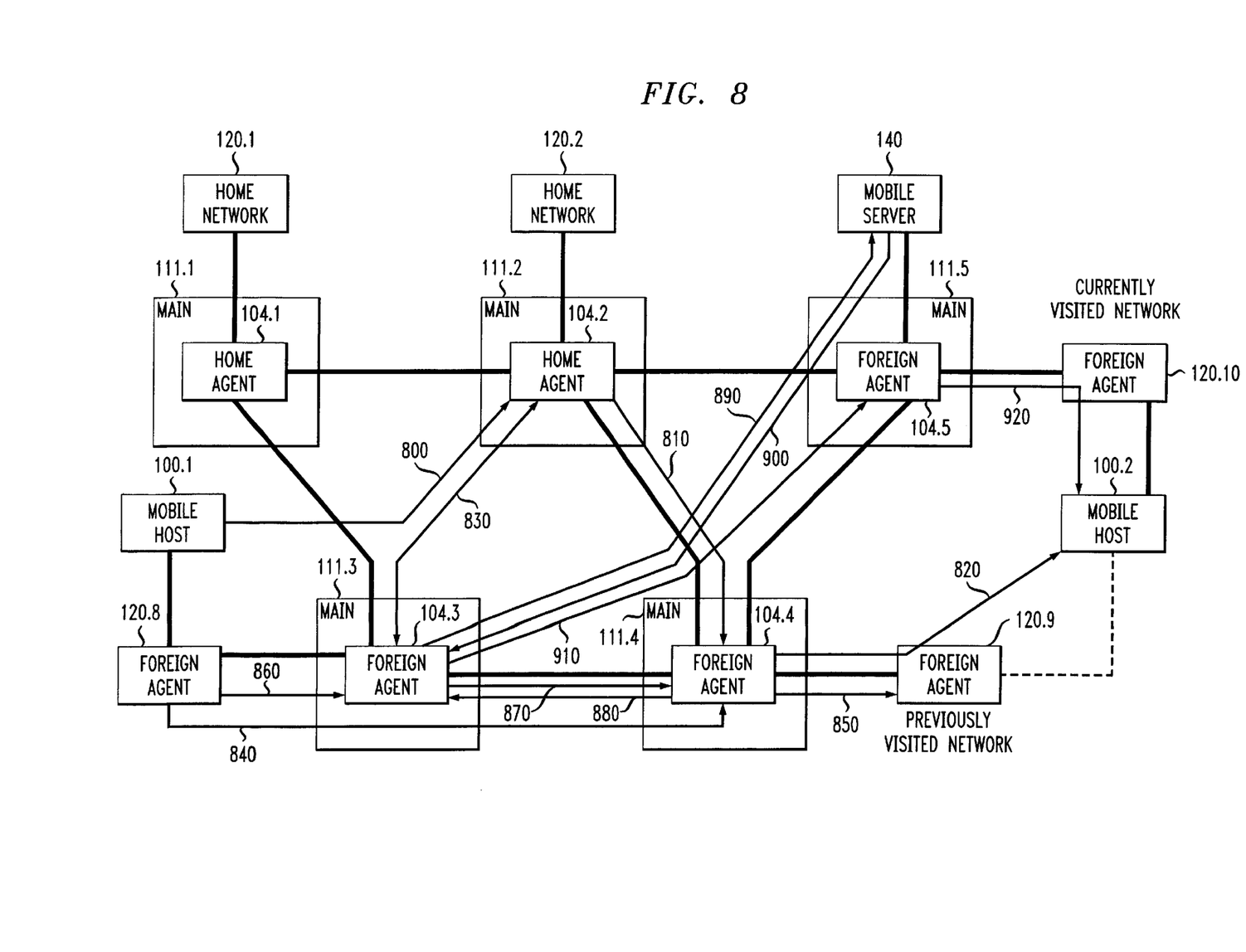
FIG. 8 is a simplified diagram of an additional network implementation of the present invention.

FIG. 8 illustrates exemplary data paths that may be established between two mobile hosts 100.1, 100.2 when both are registered in foreign networks. Initially, the second mobile host 100.2 is registered in foreign network 120.9. Recall that once a mobile host registers in a foreign network, the foreign network is designated the mobile host's "currently visited network" (CVN). As the mobile host 100.2 moves from CVN 120.9 to another foreign network 120.10, then the CVN 120.9 becomes the "previously visited network" (PVN) and the new foreign network 120.10 becomes the CVN.

Assume that the first mobile host 100.1 initiates communications. The first mobile host 100.1 sends data to the second mobile host 100.2 at its home address (Step 800). Home agent 104.2 is the home agent for the second mobile host 100.2. The home agent 104.2 forwards the data to the second mobile host's foreign agent 104.4 (Step 810). The foreign agent 104.4 forwards the data to the destination mobile host 100.2 via the foreign network 120.9 (Step 820).

Contemporaneously, the home agent 104.2 identifies the source mobile host 100.1 as the source of the data. It also identifies MAIN 111.3 as the MAIN closest to the source mobile host 100.1. Because the home agent 104.2 is not a member of MAIN 111.3, the home agent 104.2 determines that the routing path from the source mobile host 100.1 to the destination mobile host 100.2 is not optimal. The home agent 104.2 sends a request signal to the pseudo home agent 104.3 identifying the home address of the destination mobile agent 100.2 and identifying the source mobile host 100.1 (Step 830). The pseudo home agent 104.3 grants the request in an acknowledgment message. Thereafter, when the source mobile host 100.1 sends data to the destination mobile host 100.2, the pseudo home agent 104.3 will route the data directly to the foreign agent 104.4 and, thus, build an optimal path (Steps 840–850).

FIG. 8 further illustrates a procedure that is invoked when a mobile host 100.2 moves among different foreign networks. In this example, mobile host 100.2 moves from a first foreign network 120.9 to a second foreign network 120.10. Foreign network 120.9 becomes the mobile host's previously visited network; foreign network 120.10 becomes the mobile host's currently visited network. Assume that the second mobile host 100.2 moves at a time when the agent 104.3 is operating as a pseudo home agent for the mobile host 100.2. Also assume that updated information reflecting a new care-of address for the second mobile host 100.2 (at foreign agent 104.5) has not been provided to the pseudo home agent 104.3.

As usual, the source mobile host 100.1 sends data to the destination mobile host 100.2 at its home address (Step 860). The pseudo home agent 104.3 routes the data to the foreign agent 104.4 of the mobile host's previously visited network (Step 870).

The old care-of address for mobile host 100.2 has been deallocated by the foreign agent 104.4 at the previously visited network 120.9. As a result, the PVN foreign agent 104.4 determines that it cannot forward the data to mobile host 100.2. The PVN foreign agent 104.3 replies with a message indicating that the mobile host 100.2 is no longer serviced by PVN foreign agent 104.4 (Step 880). The pseudo home agent 104.4 communicates with the mobility server 140 to resolve the mobile host's current care-of address. The pseudo home agent 104.3 signals the mobility server 140 with the mobile host's home address and requests a new care-of address for the mobile host 100.2 (Step 890). The mobility server 140 replies with a new care-of address for the mobile host 100.2 (Step 900). As noted, the mobility server 140 possesses the latest care-of address information for the mobile host 100.2.

The pseudo home agent 104.3 routes the data to the new foreign agent 104.5 for the mobile host 100.2 (Step 910). The CVN foreign agent 104.5 routes the data to the mobile host 100.2 at the currently visited network 120.10 (Step 920). Accordingly, dynamic movement of a mobile host among foreign networks does not cause a loss of data.

The present invention advantageously may use the existing IETF mobility IP support protocol in implementation. Although the present invention may use a known protocol, it provides an advantage unforeseen by the art by bringing mobility support into access networks such as the MAINs.

The MAINs provide enhanced privacy by providing a home address that is unrelated to the premises network that actually serves as a mobile host's home network. The MAINs also provide for routing optimization in appropriate circumstances, thereby conserving network resources and increasing the network's capacity to route data. Finally, the MAINs provide a function to route data to mobile hosts on a dynamic basis without an interruption or loss of data.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method of providing mobility support to a mobile host, comprising, responsive to data received at a home agent:

tunneling the data to a foreign agent at a care-of-address of the mobile host, identifying an address of a correspondent host that originated the data, identifying a network associated with the correspondent host, determining whether the identified network includes its own home agent, and if the identified network includes a home agent, transferring the home address to the identified network's home agent, the identified network's home agent to be established as a pseudo home agent.

2. The method of claim 1, wherein the transferring step includes a step of providing the mobile host's home address to the identified network's home agent.

3. The method of claim 1, wherein the identified network's home agent tunnels subsequent data originated by the correspondent host and addressed to the home address to the care-of-address.

4. The method of claim 1, further comprising, prior to the tunneling:

retrieving a host profile related to the mobile host, determining whether the host profile identifies a currently visited network for the mobile host, and if so, identifying a foreign agent based on the currently visited network, and if the mobile host is registered in a foreign network, identifying a care-of address associated with the foreign network.

5. In a computer network, a method of optimizing routing of data from a correspondent host to a mobile host, the mobile host having been assigned a home address that actually addresses a home agent in a first access network and having registered with a foreign agent, the correspondent host located in a premises network associated with a second access network, the method comprising:

in the first access network:

receiving at the home agent data addressed to the home address, identifying an address of the correspondent host, identifying the second access network based upon the address of the correspondent host, identifying an agent in the second access network to be established as a pseudo home agent, and providing the home address to the pseudo home agent; and in the second access network:

routing subsequent data received from the correspondent host that is addressed to the home address to the pseudo home agent, and tunneling the subsequent data from the pseudo home agent to the foreign agent.

6. In a computer network, a method of optimizing routing of data from a correspondent host to a mobile host, the mobile host having registered with a foreign agent and having been assigned a home address that actually addresses a home agent in a first access network, the correspondent host located in a premises network associated with a second access network, the method comprising:

receiving at the home agent data addressed to the home address, identifying an address of the correspondent host, identifying the second access network based upon the address of the correspondent host, identifying an agent in the second access network to be established as a pseudo home agent, and providing the home address to the pseudo home agent.

7. The method of claim 6, further comprising:

thereafter, in the second access network, routing subsequent data received from the correspondent host that is addressed to the home address to the pseudo home agent, and tunneling the subsequent data from the pseudo home agent to the foreign agent.

8. The method of claim 6, further comprising configuring the second network to route data addressed to the home address to the pseudo home agent.

9. In a computer network, a mobility support method for a mobile host, the mobile host having been assigned a home address representing a home agent in a first access network, the mobile host having registered in a foreign premises network and having been assigned a care of address by a foreign agent in an access network associated with the foreign premises network, the method comprising:

receiving at the home agent data addressed to the home address, retransmitting the data to the foreign agent, identifying an address of the correspondent host, identifying the second access network based upon the address of the correspondent host, identifying an agent in the second access network to be established as a pseudo home agent, and providing the home address to the pseudo home agent.

10. A mobility support method, comprising, in an access network:

routing first data from a correspondent host addressed to a home address of a mobile host, the correspondent host being a member of the access network, receiving a recruitment message from a first home agent, the home agent being associated with the mobile host, the recruitment message identifying a care-of-address associated with the mobile host, responsive to the recruitment message, routing second data from the correspondent host addressed to the home address of the mobile host to a second home agent, the second home agent being a member of the access network, and tunneling the second data to a foreign agent at the care-of-address.

11. The mobility support method of claim 10, further comprising:

responsive to an error message from the foreign agent, updating the care-of-address of the mobile host, and tunneling the second data to another foreign agent at the updated care-of-address.

12. A method of providing mobility support to a mobile host, comprising, responsive to data received at a first home agent:

tunneling the data to a foreign agent at a care-of-address of the mobile host, identifying an access network associated with a correspondent host that originated the data, determining whether the access network includes its own home agent, and if the access network's home agent is different from the first home agent, transferring the home address to the access network's home agent, the access network's home agent to be established as a pseudo home agent.

13. The method of claim 12, wherein the transferring step includes a step of providing the mobile host's home address to the access network's home agent.

14. The method of claim 12, wherein the access network's home agent tunnels subsequent data originated by the correspondent host and addressed to the home address to the care-of-address.

15. The method of claim 12, further comprising, prior to the tunneling:

retrieving a host profile related to the mobile host, determining whether the host profile identifies a currently visited network for the mobile host, and if so, identifying a foreign agent based on the currently visited network, and if the mobile host is registered in a foreign network, identifying a care-of address associated with the renetwork.

* * * * *